United States Patent
Newman et al.

(10) Patent No.: US 11,509,381 B2
(45) Date of Patent: Nov. 22, 2022

(54) RESOURCE-EFFICIENT BEAM SELECTION IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 6G, LLC, Palos Verdes, CA (US)

( * ) Notice: Subject to any disclaimer, the term of this patent is extended or adjusted under 35 U.S.C. 154(b) by 0 days.

(21) Appl. No.: 17/750,936

(22) Filed: May 23, 2022

(65) Prior Publication Data

US 2022/0286186 A1    Sep. 8, 2022

Related U.S. Application Data

(60) Provisional application No. 63/342,437, filed on May 16, 2022, provisional application No. 63/278,578, filed on Nov. 12, 2021.

(51) Int. Cl.
| | |
|---|---|
| *H04B 7/06* | (2006.01) |
| *H04W 72/04* | (2009.01) |
| *H04W 24/10* | (2009.01) |

(52) U.S. Cl.
CPC ......... *H04B 7/0695* (2013.01); *H04B 7/0626* (2013.01); *H04W 24/10* (2013.01); *H04W 72/044* (2013.01)

(58) Field of Classification Search
CPC ... H04B 7/0695; H04B 7/0626; H04W 24/10; H04W 72/044
See application file for complete search history.

(56) References Cited

U.S. PATENT DOCUMENTS

| | | | |
|---|---|---|---|
| 6,593,880 B2 | 7/2003 | Velazquez | |
| 2002/0147032 A1 | 10/2002 | Yoon | |
| 2003/0125046 A1 | 7/2003 | Riley | |
| 2010/0124212 A1 | 5/2010 | Lo | |
| 2011/0238286 A1 | 9/2011 | Roesser | |
| 2018/0191417 A1* | 7/2018 | Kim | H04B 7/04 |
| 2018/0198511 A1* | 7/2018 | Maamari | H04B 7/0626 |
| 2019/0207636 A1* | 7/2019 | Luo | H01Q 3/36 |
| 2019/0229776 A1* | 7/2019 | Cao | H04W 56/001 |
| 2019/0364390 A1 | 11/2019 | Kurras | |

(Continued)

FOREIGN PATENT DOCUMENTS

WO    2017184190    10/2017

*Primary Examiner* — Kenneth T Lam
(74) *Attorney, Agent, or Firm* — Mayer & Williams PC

(57) ABSTRACT

Communications in 5G and 6G can use "beams" to focus electromagnetic energy on the recipient, and the recipient can likewise arrange a focused reception "beam" toward the transmitter, thereby saving energy and avoiding interference. However, aligning the transmission and reception beams remains an arduous process. Herein, procedures are disclosed for rapid and efficient beam alignment at both transmission and reception devices, using very brief response signals to select an optimal beam direction for best signal quality. By encoding the selected beam index in the time, frequency, and optionally modulation of the brief signal, the transmitter and receiver can cooperate to optimize communication and save energy.

9 Claims, 8 Drawing Sheets

(56) References Cited

U.S. PATENT DOCUMENTS

| | | | |
|---|---|---|---|
| 2020/0022171 A1* | 1/2020 | Guan | H04B 7/0695 |
| 2020/0068549 A1* | 2/2020 | Kang | H04W 16/28 |
| 2020/0112360 A1 | 4/2020 | Krunz | |
| 2020/0177266 A1* | 6/2020 | Kang | H04W 76/27 |
| 2020/0374960 A1* | 11/2020 | Deenoo | H04W 72/1284 |
| 2021/0007173 A1 | 1/2021 | Su | |
| 2021/0044403 A1* | 2/2021 | Zhang | H04L 5/0053 |
| 2021/0203398 A1 | 7/2021 | Kapetanovic | |
| 2021/0273714 A1* | 9/2021 | Lee | H04B 7/088 |
| 2021/0297126 A1* | 9/2021 | Cao | H04J 11/0069 |
| 2021/0306870 A1 | 9/2021 | Lee | |
| 2021/0328691 A1 | 10/2021 | Palally | |
| 2021/0336686 A1 | 10/2021 | Rune | |
| 2021/0351835 A1 | 11/2021 | Woo | |
| 2022/0006505 A1 | 1/2022 | Ryu | |
| 2022/0018925 A1 | 1/2022 | Duan | |
| 2022/0247458 A1* | 8/2022 | Yu | H04L 1/20 |

\* cited by examiner

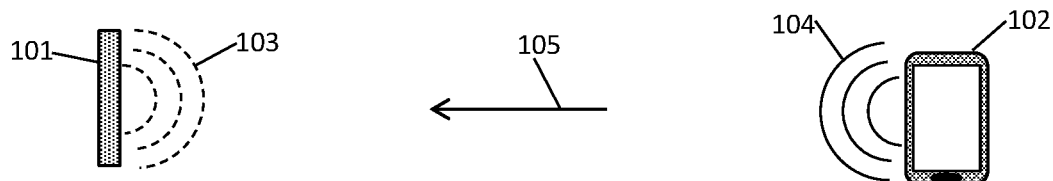
FIG. 1A
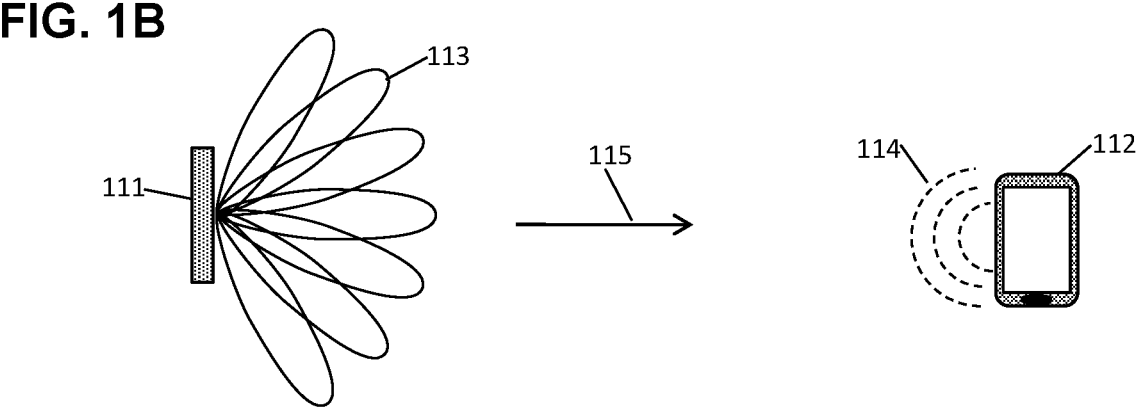
FIG. 1B
FIG. 1C
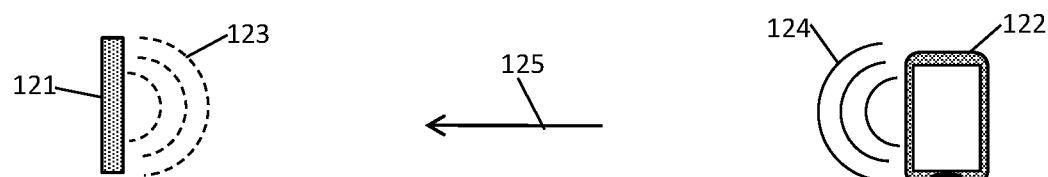
FIG. 1D
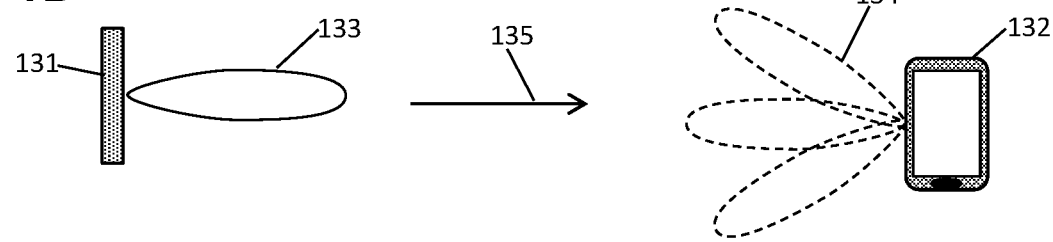
FIG. 1E
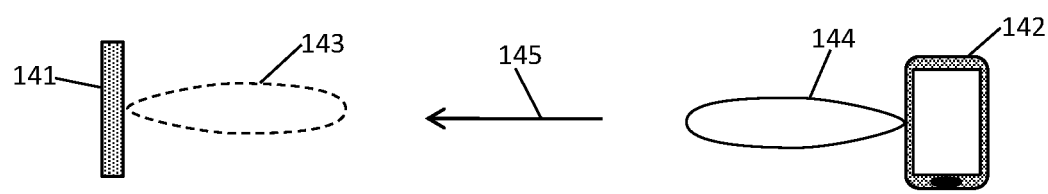

FIG. 3A

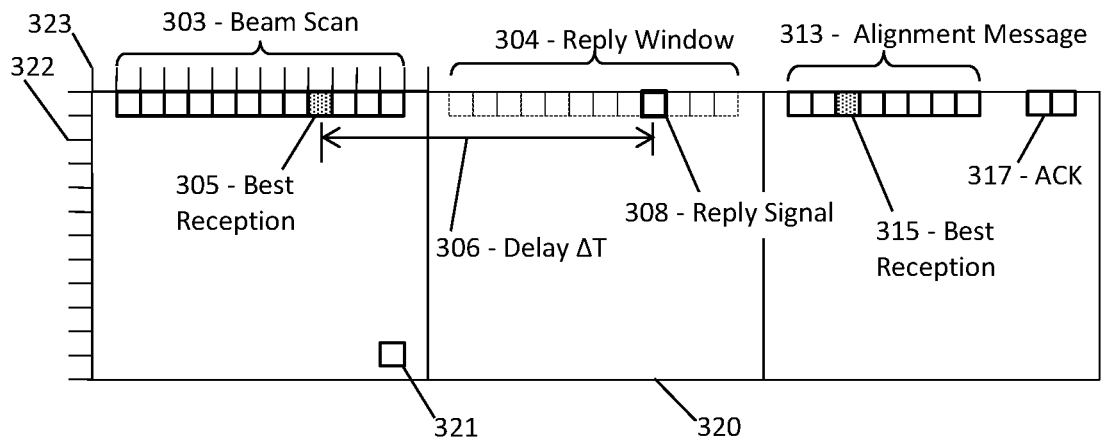

FIG. 3B

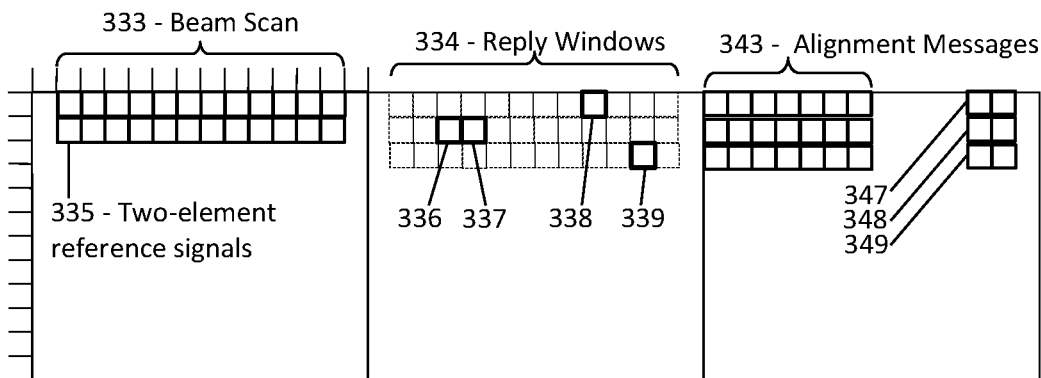

FIG. 3C

351 - Base station transmits multiple brief signals at different beam directions in successive symbol-times. Each transmission may be a single resource element or a multi-element resource signal occupying multiple subcarriers.

↓

352 - One or more user devices transmit brief reply signals at time corresponding to the best-received beam scan signal, each user device assigned to a different subcarrier. If two best beams, transmit two reply messages.

↓

353 - Base station transmits multiple identical alignment signals in direction selected by user device. If multiple user devices, alignment signals are transmitted on different subcarriers, directed to each user device.

FIG. 4A

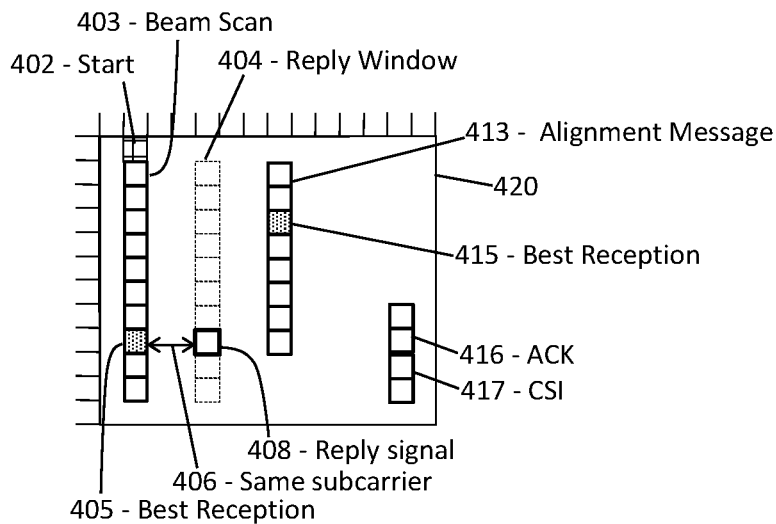

FIG. 4B

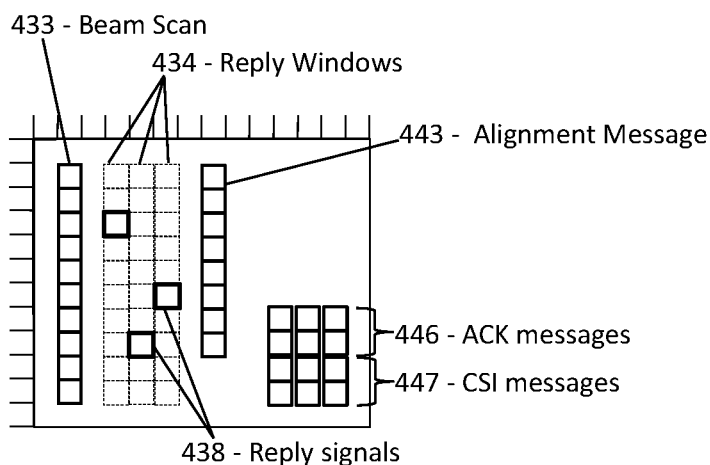

FIG. 4C

451 - Base station transmits multiple brief signals at different beam directions in successive subcarriers.

↓

452 - One or more user devices transmit brief reply signals at subcarrier corresponding to the best-received beam scan signal, each user device assigned to a different symbol-time for the reply signal.

↓

453 - Base station transmits multiple identical alignment signals in direction selected by user device. If multiple user devices, each alignment signal is transmitted in multiple directions at the same time, directed to each user device.

FIG. 5A

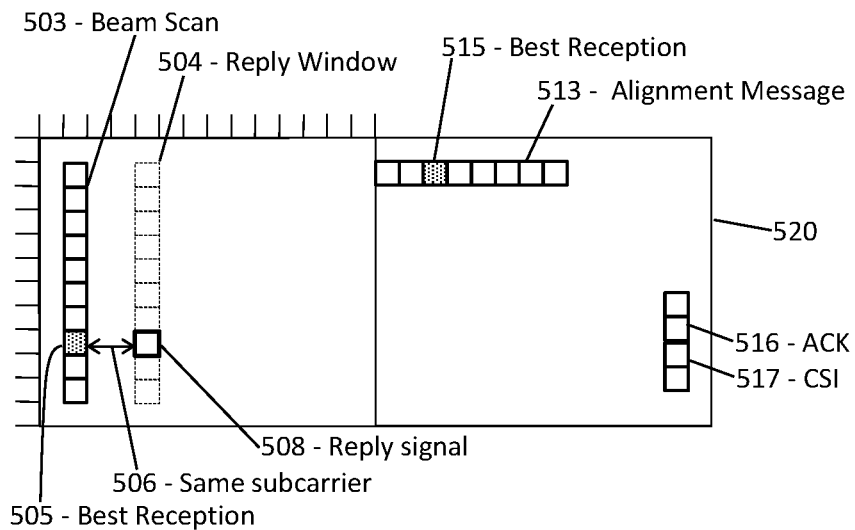

FIG. 5B

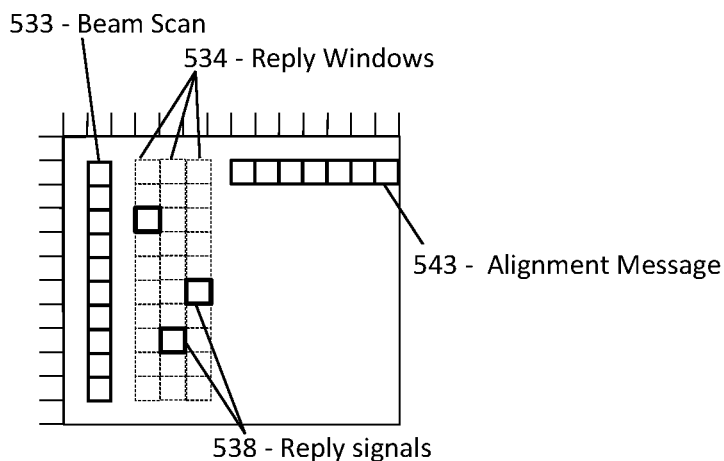

FIG. 5C

| 551 - Base station transmits multiple brief signals on different beam directions in successive subcarriers. |
|---|
| 552 - One or more user devices transmit brief reply signals at subcarrier(s) corresponding to the best-received beam scan signal, each user device assigned to a different symbol-time. |
| 553 - Base station transmits multiple identical alignment signals in successive symbol-times, time-spanning and non-directionally. User devices align own beams toward base station using alignment signals. No ACK or CSI needed. |

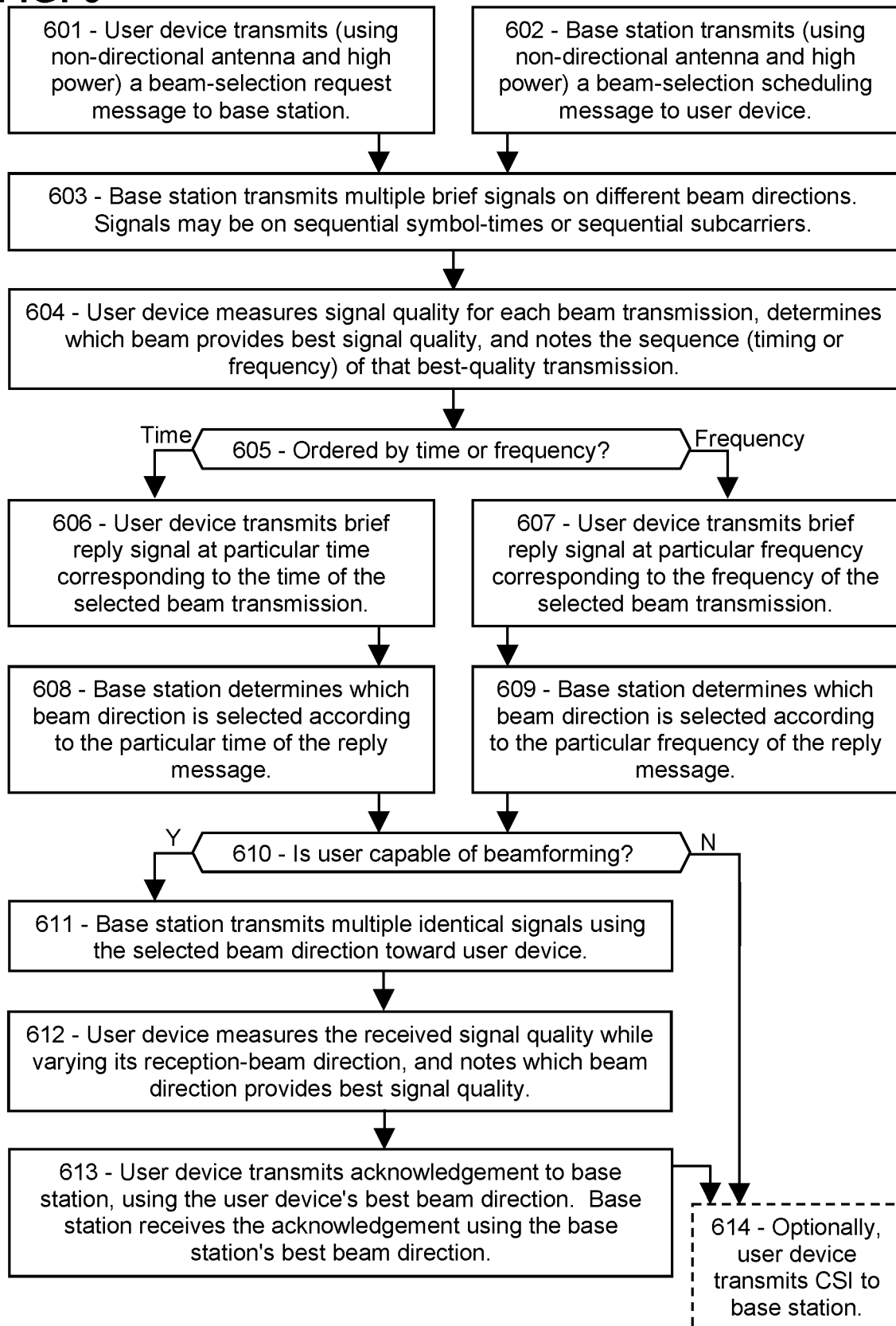

RESOURCE-EFFICIENT BEAM SELECTION IN 5G AND 6G

PRIORITY CLAIMS AND RELATED APPLICATIONS

This application claims the benefit of U.S. Provisional Patent Application Ser. No. 63/278,578, entitled "Location-Based Beamforming for Rapid 5G and 6G Directional Messaging", filed Nov. 12, 2021, and U.S. Provisional Patent Application Ser. No. 63/342,437, entitled "Resource-Efficient Beam Selection in 5G and 6G", filed May 16, 2022, all of which are hereby incorporated by reference in their entireties.

FIELD OF THE INVENTION

The disclosure pertains to wireless beamforming, and more particularly to means for selecting an optimum beam direction.

BACKGROUND OF THE INVENTION

In 5G and 6G, many communications are carried out using "beams" or directed radiation, aimed at the intended recipient. A complex time-consuming procedure is required to align the beams in the right directions. What is needed is a simpler, more efficient procedure for selecting an optimal beam direction.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a base station of a wireless network to align a beam from the base station to a user device of the network, the method comprising: transmitting a plurality of beam scan signals, each beam scan signal comprising a wireless transmission focused in a different direction, the beam scan signals spaced apart in time or in frequency; receiving, from the user device, a reply signal indicating a particular beam scan signal, the reply message comprising a wireless transmission at a time corresponding to a time of the particular beam scan signal or at a frequency corresponding to a frequency of the particular beam scan signal; and transmitting, to the user device, a subsequent message directed according to the particular beam scan signal.

In another aspect, there is a user device of a wireless network comprising a base station, the user device configured to: receive a plurality of beam scan signals, each beam scan signal transmitted in a different direction by the base station, the beam scan signals spaced apart in time or in frequency; measure a signal quality of each beam scan signal, the signal quality comprising an amplitude, a power level, or a signal-to-noise ratio; determine a particular beam scan signal having a best or highest signal quality; determine a particular time or a particular frequency associated with the particular beam scan signal; and transmit, to the base station, a reply signal indicating the particular time or the particular frequency.

In another aspect, there is non-transitory computer-readable media in a base station of a wireless network comprising a user device, the media containing instructions that, when executed in a computing environment, cause a method to be performed, the method comprising: transmitting a plurality of beam scan signals, each beam scan signal having the same amplitude and phase, and each beam scan signal transmitted in a different direction, wherein the beam scan signals occupy sequential symbol-times or sequential sub-carriers of a resource grid defined by the network; monitoring a reply window comprising a predetermined region of the resource grid following the beam scan signals, and detecting at least one reply signal in the reply window; determining, according to a time or a frequency of the at least one reply signal, a particular beam scan signal; determining, according to the particular beam scan signal, a particular geographical direction; and transmitting, to the user device, a geographical direction message indicating the particular geographical direction.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 1A is a schematic showing an exemplary embodiment of a request message from a user device to a base station, according to some embodiments.

FIG. 1B is a schematic showing an exemplary embodiment of a beam scan from a base station to a user device, according to some embodiments.

FIG. 1C is a schematic showing an exemplary embodiment of a reply message from a user device to a base station, according to some embodiments.

FIG. 1D is a schematic showing an exemplary embodiment of an alignment message from a base station to a user device, according to some embodiments.

FIG. 1E is a schematic showing an exemplary embodiment of an acknowledgement message from a user device to a base station, according to some embodiments.

FIG. 3A is a schematic showing a resource grid with an efficient time-spanning beam selection, according to some embodiments.

FIG. 3B is a schematic showing a resource grid with time-spanning beam alignment messages for multiple users, according to some embodiments.

FIG. 3C is a flowchart showing an exemplary embodiment of a time-spanning procedure for base stations and multiple user devices to align their beams, according to some embodiments.

FIG. 4A is a schematic showing an exemplary embodiment of an efficient frequency-spanning beam selection, according to some embodiments.

FIG. 4B is a schematic showing an exemplary embodiment of an efficient frequency-spanning beam selection for multiple users, according to some embodiments.

FIG. 4C is a flowchart showing an exemplary embodiment of a frequency-spanning procedure for base stations and multiple user devices to align their beams, according to some embodiments.

FIG. 5A is a schematic showing another exemplary embodiment of an efficient frequency-spanning beam selection, according to some embodiments.

FIG. 5B is a schematic showing another exemplary embodiment of an efficient frequency-spanning beam selection for multiple users, according to some embodiments.

FIG. 5C is a flowchart showing an exemplary embodiment of a simpler procedure for base stations and multiple user devices to align their beams, according to some embodiments.

FIG. 6 is a flowchart showing an exemplary embodiment of a procedure for aligning beam directions, according to some embodiments.

Like reference numerals refer to like elements throughout.

DETAILED DESCRIPTION

Figure 2A:
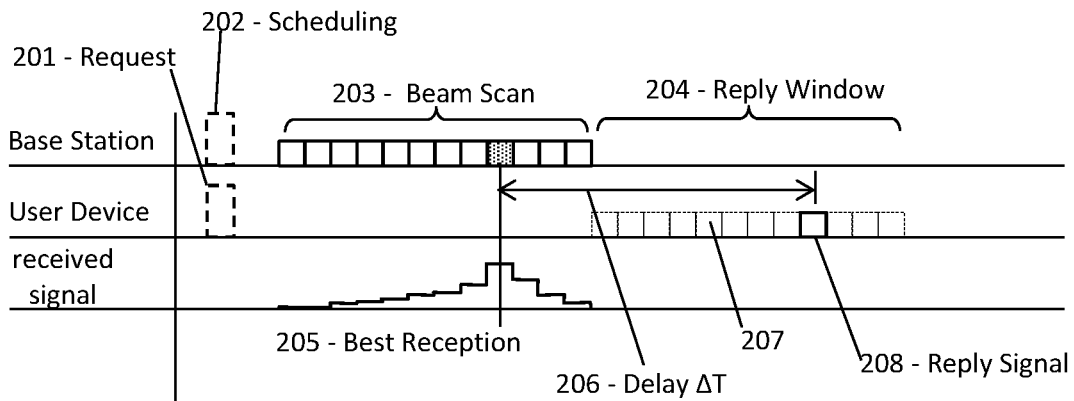
FIG. 2A is a sequence chart showing an exemplary embodiment of an efficient transmission beam scan from a base station to a user device, according to some embodiments.

Systems and methods disclosed herein (the "systems" and "methods", also occasionally termed "embodiments" or "arrangements" or "versions", generally according to present principles) can provide urgently needed wireless communication protocols for aligning directional transmission beams and reception beams to improve communication quality. Instead of wasting time and resources on a multi-step handshaking procedure, the transmitter and receiver can cooperate to select the best beam direction at both ends efficiently, starting with no knowledge of their relative positions.

To assist user devices in aligning their beams, and to align the base station beams toward the user devices, a base station can first transmit a scheduling message informing user devices of a planned beam scan, or alternatively a user device can transmit a request message requesting beam alignment service. In either case, the base station then transmits a series of brief "beam scan" signals in a sequence of directions. A user device can monitor the beam scan signals using a non-directional antenna, and can determine which signal provides the best reception. The user device can then emit a brief reply signal at a particular time and/or frequency corresponding to the best-quality beam signal, again using a non-directional antenna for transmission. The base station can receive the reply signal at a particular time or frequency corresponding to the favored beam scan signal, and can determine, from the particular time or frequency, which transmission beam produced the best reception for that user device. Then, the base station may transmit an "alignment" message consisting of several resource elements, all at the same power level. The user device can receive the alignment message while varying its reception beam directions, and thereby determine which reception beam provides the best reception for that user device. Thus the base station and the user device have aligned their transmission and reception beams toward each other, thereby completing the beam configuration at both ends.

Often there are multiple user devices that need beam alignment service, in which case they can all measure the beam scan signals, determine which beam works best for each user device, and transmit a reply message on separate pre-assigned subcarriers or symbol-times. The base station will know, according to the time and frequency of each reply signal, which user device desires which beam setting. In addition, the base station can transmit one alignment message non-directionally, or it can transmit a plurality of alignment messages each in the direction of one of the user devices. The user devices can receive the alignment message while varying their reception beam directions, and thereby determine the optimal beam direction toward the base station for each user device. Then, each user device can transmit an acknowledgement and/or a channel-state information message, using the recently-determined optimal beam direction of the user device, while the base station receives the message using the beam direction selected by each user device.

Optionally, the beam scan signals can be configured as a single resource element for compactness, or as two resource elements carrying a reference signal, or other number of resource elements. Optionally, the reply message may be a single resource element, or as two or more resource elements conveying additional information, and may be modulated to carry yet additional information. Optionally, the user device can transmit two reply signals instead of one, thereby indicating two of the beam scan signals, and the base station can interpolate between the indicated beams to provide a beam direction with higher precision. Optionally, the acknowledgement could include additional information, such as an indication of the signal quality determined by the user device, so that the base station can then adjust its transmission power level. The base station can also instruct the user device regarding the user device's power levels, for example. Optionally, the same beam selection process could be carried out in reverse, with the user device providing the beam scan signals in different directions, and the base station selecting the best transmission beam, followed by the user device transmitting an alignment message while the base station varies its reception beam direction and selects the best reception beam. Optionally, two user devices (such as vehicles in traffic) can align their beams toward each other without base station involvement, by carrying out the disclosed procedures in sidelink.

User devices and base stations, by aligning their transmission and reception beams using the disclosed resource-efficient procedures, can rapidly and efficiently gain improved communications with less energy consumption, less background radiation and interference due to the lower transmission power levels and reduced angular spread, and can thereby improve network performance generally, according to some embodiments.

"Reciprocity" is assumed throughout, in the sense that the same beam direction is optimal for both reception and transmission purposes, and the same spatial trajectory is optimal for both the user device and the base station.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "sub-channel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "PAM" (pulse-amplitude modulation) refers to separately amplitude-modulating two signals and then adding them with a 90-degree phase shift. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. QPSK is phase modulated but not amplitude modulated. 16QAM may be modulated according to PAM which exhibits two phase levels at zero and 90 degrees (or in practice, for carrier suppression, ±45 degrees) and four amplitude levels including two positive and two negative amplitude levels, thus forming 16 distinct modulation states. For comparison, classical amplitude-phase modulation in 16QAM includes four positive amplitude levels and four phases of the raw signal, which are multiplexed to produce the 16 states of the modulation scheme. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-checking code. "RNTI" (radio network temporary identity) is a network-assigned user code. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" or "reference elements" modulated according to the modulation scheme of the message and configured to exhibit levels of the modulation scheme (as opposed to conveying data). Thus integer Nref is the number of reference resource elements in the demodulation reference. A "calibration set" is one or more amplitude values (and optionally phase values), which have been determined according to a demodulation reference, representing the predetermined modulation levels of a modulation scheme. Thus the receiver can determine modulation levels from one or more demodulation reference, calculate intermediate levels by interpolation if needed, and then record the modulation levels in the calibration set. Each modulation level in the calibration set may have a code or number associated with it, and the receiver can demodulate the message element by selecting the modulation level in the calibration set that most closely matches the observed modulation level of the message element, and then assigning that associated code or number to the message element. If the message element has more than one modulation level, such as amplitude and phase, then the two associated codes or numbers may be concatenated to form the demodulated message element. Generally the modulation scheme includes integer Nlevel predetermined amplitude or phase levels. "RF" or radio-frequency refers to electromagnetic waves in the MHz (megahertz) or GHz (gigahertz) frequency ranges. A "sum-signal" is a waveform including the combined signals from a plurality of separately modulated subcarriers. A "short-form demodulation reference" is a compact demodulation reference exhibiting, generally, the maximum and minimum amplitude or phase levels of a polarization scheme so that the receiver can calculate other levels by interpolation. A "beam" is a directed electromagnetic transmission or reception signal, as opposed to an isotropic or non-directional transmission or reception. A "transmission beam" is a spatially narrow or focused energy transmission, and a "reception beam" is a spatially narrow sensitivity or focused efficiency distribution in a reception antenna (usually, the same physical antenna can be used for both transmission and reception). Beams may be generated by multi-element antennas using analog or digital electronic controls. "Reciprocity" is assumed herein, whereby the signal path from the base station to the user device is the same as the signal path from the user device to the base station, and an optimal beam direction for transmission is the same as an optimal beam direction for reception. "Alignment" of a transmission or reception beam by a first wireless entity in communication with a second wireless entity means determining a direction at which the first entity can aim its beam to optimize the signal quality obtained by the second wireless entity. "Non-directional means isotropic, or at least uniform in a horizontal plane.

Turning now to the figures, a first example shows, schematically, signals between a user device and a base station to select optimal beams at both ends.

FIG. 1A is a schematic showing an exemplary embodiment of a request message from a user device to a base station, according to some embodiments. As depicted in this non-limiting example, a base station antenna 101, viewed from the top, is in communication with a user device 102, depicted as a mobile phone. The user device 102 transmits a request message 104. The request message 104 is configured to initiate a beam scan procedure as disclosed herein. The request message 104 is transmitted non-directionally, as indicated by the nested circles. The request message 104 propagates from the user device 102 to the base station 101 as indicated by an arrow 105. The base station 101 monitors the channel or frequency of the signal 104 using a non-directional receptivity 103 of the antenna 101, as indicated by dashed arcs.

In these figures, distributions of transmitted energy are indicated by solid lines such as 104, while reception sensitivity distributions are indicated by dashed lines such as 103. Directional beams are indicated by narrow ovals, and non-directional distributions by nested arcs. Since the user device 102 and the base station 101 do not initially know each other's location, in this example, they both employ non-directional communication distributions for transmitting and receiving the request message 105.

As an alternative, the base station can initiate the process by transmitting a scheduling message (not shown) to the user device, indicating a time and frequency at which the beam selection messages will appear. As a third alternative, the user device can request it and the base station can then schedule it in response. As a fourth alternative, the beam alignment process may be triggered automatically when a new user device joins the network. Other preparatory messages may also be employed to coordinate the two entities.

FIG. 1B is a schematic showing an exemplary embodiment of a beam scan from a base station to a user device, according to some embodiments. As depicted in this non-limiting example, the base station antenna 111 and the user device 112 are as described previously, but now the base station 111 is transmitting and the user device 112 is receiving. Responsive to the request message 105, (or the scheduling message or joining the network, etc.) the base station transmits a series of brief "beam scan" signals, each beam scan signal transmitted on separate transmission beam directions 113, thereby covering a range of directions with separate signals. The transmission beam scan signals 113 may be spaced apart in time or in frequency. The beam scan signals 113 propagate from the base station 111 to the user device 112 as indicated by an arrow 115. The user device 112 monitors the channel at a predetermined time and a predetermined frequency range, and thereby receives or attempts to receive the beam scan signals 113. Since the user device 112 does not know the direction toward the base station 111 at this point, the user device 112 employs a non-directional reception distribution 114 to receive the beam scan signals 113, as indicated by the dashed non-directional arcs. As mentioned, the beam scan signals 113 are shown as solid lines indicating transmission distributions, while the reception distribution 114 is shown in dashed lines indicating reception. In general, most of the transmitted beam scan signals 113 are likely to be misdirected, resulting in zero or near-zero reception at the user device 112, whereas one (or possibly two) of the beam scan signals 113 may be directed toward the user device 112, and those few beam scan signals may be detected with relatively high amplitude. The user device 112 may be configured to select the "best" beam scan signal 113, having the best or highest quality reception, the highest as-received amplitude or power, or other measure of signal quality.

In some embodiments, each beam scan signal 113 may be a single resource element carrying a uniform sine wave transmission. Each beam scan signal 113 may be identified, and the beam direction determined, according to the time and frequency of each beam scan signal 113. If each beam scan signal 113 occupies a distinct time or frequency, that time-frequency position may be sufficient to enable the user device 112 to identify which of the transmission beams has the best reception. In that case, it may not be necessary to encode further information in the beam scan signals 113, and therefore the beam scan signals 113 may be just a single resource element. Each beam scan signal may be unmodulated carrier at the subcarrier frequency, or other signal, for example. However, all of the beam scan signals 113 preferably have the same signal properties such as amplitude and phase, but different directions. The user device 112 can determine the time or frequency of the optimally-received beam scan signal 113 by comparing the as-received amplitudes and determining at what time or frequency the best signal is observed.

As an alternative, the base station 111 may transmit each beam scan signal 113 as two resource elements, or other number of resource elements. For example, the beam scan signal with two resource elements may be modulated as a reference signal, such as a short-form two-point demodulation reference. When the beam scan signal includes multiple resource elements, the user device 112 may be able to obtain an improved measure of the signal quality due to the additional measurement time. If the beam scan signals are configured as demodulation references, the user device may recalibrate the demodulation levels according to the modulation of the best-received beam scan signal 113, saving further time and resources.

After determining which beam scan signal 113 provides the best reception quality, the user device 112 can then communicate that choice back to the base station 111, as discussed below.

FIG. 1C is a schematic showing an exemplary embodiment of a reply signal from a user device to a base station, according to some embodiments. As depicted in this non-limiting example, a user device 122 transmits a reply signal 124 to a base station antenna 121, responsive to the beam scan of the previous figure. The reply signal 124 is configured to indicate which of the beam scan signals 113 is selected for best reception. The user device 122 transmits the reply signal 124 non-directionally (as indicated by the solid curves 124) because the user device 122 does not know the direction toward the base station 121 at this point, and therefore cannot aim a transmission beam toward the base station. The reply signal propagates to the base station 121 as indicated by an arrow 125. The base station is configured to monitor a particular range of time and frequency during which the base station 121 expects to receive the reply signal 124. The base station 121 uses a non-directional reception distribution 123 to receive the reply signal because the base station 121 does not know the direction toward the user device 122 at this point.

In some embodiments, the reply signal 124 may be a single resource element with a uniform sine wave transmission. The reply signal 124 may be transmitted at a particular time or frequency. The time or frequency of the reply signal 124 may correspond to the time or frequency of the best-received beam scan signal 113. The reply signal 124 may thereby specify which beam scan signal 113 is favored. For example, if the beam scan signals 113 are spaced apart in time, the user device can transmit the reply signal 124 at a particular time which is a predetermined time delay after the favored beam scan signal. Alternatively, if the beam scan signals 113 are transmitted in successive subcarriers at a single time, the user device may transmit the reply signal 124 at the same subcarrier or frequency as the favored beam. In either case, the base station 121 can identify the selected beam 113 according to the time or frequency of the reply signal 124.

In a first embodiment, the various beam scan signals 113 are transmitted sequentially in time, and the user device transmits the reply signal 124 at a particular time corresponding to the selected beam's symbol-time. More specifically, each beam scan signal 113 may be transmitted in successive symbol-times of a first subframe (time-spanning), and the user device 122 can transmit the brief reply signal 124 at the same symbol-time of the next subframe (that is, a predetermined delay time later). The base station 122 can determine, according to the timing of the reply signal 124, which of the beam scan signals 113 is favored. In a second embodiment, the beam scan signals 113 are transmitted in sequential subcarrier frequencies at the same symbol-time (frequency-spanning), and the user device 122 determines which subcarrier has the best signal. The user device then transmits the reply signal 124 on that same subcarrier at a subsequent agreed-upon time. In either case, the brief reply message 124, such as a single resource element, may be sufficient to inform the base station 121 of the user device's choice regarding the optimal beam direction.

In some cases, the user device 122 may find that two of the beam scan signals 113 provide nearly the same high level of reception. In that case, the user device 122 can transmit two reply messages 124, indicating the two best beam directions. As a further alternative, if the two best beam scan signals differ in their received signal quality, the user device can transmit two reply signals in adjacent resource elements corresponding to the two favored beams, but with two different amplitudes proportional to the two received amplitudes. The base station, upon receiving the two reply messages at different amplitudes, can then interpolate between the two beam directions indicated, based on the reply message amplitudes, and can use the interpolated beam direction thereafter in communicating with the user device 122.

As another option, the user device can include further information in the reply message by modulating the reply signal. For example, if the reply signal is modulated as QPSK, the phase may indicate further information. If yet more information transfer is needed, the reply message may have two resource elements, or other number of resource elements. The reply message may thereby convey a channel-state information message, for example.

FIG. 1D is a schematic showing an exemplary embodiment of an alignment message, transmitted from a base station to a user device, according to some embodiments. As depicted in this non-limiting example, a base station antenna 131 transmits an "alignment" message 133 directed toward a user device 132, using the user device's previously selected beam direction 113. The alignment message 133 is a constant signal occupying multiple resource elements. The user device 132 can align its beam toward the base station by varying its beam direction while receiving the alignment message signals and determining which direction provided the best reception. For example, the alignment message 133 may be transmitted by the base station 131 as a time-spanning message, in sequential symbol-times at a particular subcarrier frequency, with all of the resource elements of the alignment message being identical in transmission direction and amplitude and phase. The alignment message may be transmitted non-directionally, or using the favored beam direction of the user device as determined in the previous steps.

The alignment message propagates toward the user device 132 as indicated by an arrow 135. The user device 132 then attempts to receive the each resource element of the alignment message 133, while varying its reception beam 134 across multiple directions. The user device thereby measures the received amplitude using each of its reception beams 134 sequentially, and can thereby determine which beam direction best detects the alignment message 133 signals. The user device 132 can then use that best beam direction thereafter for communicating with the base station 131.

As an alternative, the user device 132 may be capable of preparing multiple reception beams at the same time, on different subcarriers. (This is difficult, and requires digital beamforming.) If so, then the base station 131 may transmit the alignment message 133 frequency-spanning (in sequential subcarriers at the same symbol-time), instead of time-spanning (in successive symbol-times) as described above, and the user device 122 can determine which subcarrier provides the best reception, and can thereby determine which of its reception beams to employ.

The user device 132 may determine that two adjacent reception beams 134 provide similar high levels of signal quality. The user device 132 can then use an intermediate reception beam direction by averaging, or weighted averaging, or interpolation, between the two favored reception beam directions.

As an option, the user device 132 may provide additional information in the reply message 124, such as a CSI (channel state information) message indicating the quality of the received signal. The reply message 124 may occupy more than one resource element in that case. For example, the user device may measure the amplitude of the alignment message 133 in the best or favored reception beam direction 134, and may report that amplitude (or power level or SNR or other measure of signal quality) back to the base station 131 at that time.

FIG. 1E is a schematic showing an exemplary embodiment of an acknowledgement message from a user device to a base station, according to some embodiments. As depicted in this non-limiting example, the user device 142 transmits an acknowledgement message 145 directly toward the base station 141 by using a transmission beam 144 aimed in the same direction as the user device's favored reception beam 134. The user device thus assumes that the optimal transmission beam is in the same direction as the optimal reception beam. Preferably the base station 141 receives the acknowledgement message 144 using a narrow reception beam 143, which is in the same direction as the favored transmission beam 113, as determined during the initial beam scan of FIG. 1B. Reception of the acknowledgement message 145 thereby establishes the beamformed link between the user device 142 and the base station 141.

In most cases, both entities can reduce their transmission power to a lower level after configuring their beams, because the transmitted energy is thereby focused into a narrow directional beam instead of an isotropic broadcast. For example, the base station can determine, from the amplitude or power level of the as-received acknowledgement message 145, whether the user device 142 can obtain a satisfactory SNR if the user device reduces its transmitted power, and if so, may instruct the user device 142 to adjust its power level accordingly. In addition, the user device may determine, from the reception of the continuous signal 133, the signal amplitude (or SNR or received power etc.) in the user device's optimal reception beam 134, and may include an indication of that value in the acknowledgement message 145, or in a CSI accompanying the acknowledgement, for example. The base station 141, upon receiving the CSI, may then lower its own transmission power on future messages to that user device 142, in order to minimize background generation and interference.

In some cases, the user device 142 may be incapable of beamforming. In that case, the alignment message 133 and the acknowledgement 144 may be skipped. The base station 131 may have previously determined whether the user device 132 is capable of beamforming, for example in a message transmitted by the user device 132 upon joining the network.

In some embodiments, the beam scan signals 113, the reply message 125, and the alignment message 133 may be modulated according to a modulation scheme, and may thereby carry additional information.

In some embodiments, the beam scan signals 113 and/or the reply signal 125 may include multiple resource elements, instead of a single resource element as described. Such longer signals may thereby convey additional information.

In some embodiments, the user device 102 may indicate, in its request message 105 or its reply signal 125 or its acknowledgement message 145, or otherwise, that the user device 102 is in motion, such as a vehicle. In that case, the base station 101 may provide wider beam widths in the beam scan signals 113 than for a stationary user device. Wider beams may avoid link failure due to the user device drifting out of a narrow beam distribution.

In some embodiments, the roles can be reversed. The user device can perform the steps indicated above for the base station (such as transmitting beam scan signals in various directions), and the base station can perform the steps indicated above for the user device (such as selecting the beam that gives the best reception). Both entities can achieve mutual beam directionality, regardless of which one transmits the beam scan signals 113 and the alignment message 133.

In another embodiment, two user devices may use the disclosed procedures to align their beams, without participation by a base station. For example, a pair of vehicles in traffic may use the procedures to adjust their reception and transmission beam directions.

In some cases, a reduced-capability user device may be unable to adjust directional transmission and reception beams, due to limitations in the user device's small antenna, for example. However, such a user device can still assist the base station in determining the base station's optimal beam direction for communicating with that user device by selecting the beam scan signal with the best reception, as indicated in FIG. 1B. Then, the reduced-capability device may skip or simply ignore the step of adjusting the user device's receptivity beam in FIG. 1D. The reduced-capability user device may continue to use non-directional receptivity 114 for communications thereafter, while the base station continues to use beamformed transmissions and receptions when communicating with that user device.

Following is a second example, providing more detail about how a receiving device can measure signal amplitudes and thereby select the optimal beam direction for both transmission and reception beams.

FIG. 2A is a sequence chart showing an exemplary embodiment of a resource-efficient transmission beam scan, from a base station to a user device, according to some embodiments. A sequence chart is a graphic showing actions and signals from various entities versus time, which is horizontal. As depicted in this non-limiting example, the procedure may begin with a user device transmitting a request message 201 (dashed) to a base station, requesting beam adjustment service, or a base station transmitting a scheduling message 202 (dashed) specifying the time of the scan. Then base station transmits a plurality of beam scan signals 203, each in a different direction, and then monitors the same frequency during a reply window 204 to detect a reply signal from the user device. In addition, optionally, the base station may transmit a start signal (not shown) which indicates to the user device that the beam scan is about to begin. The request message 201 and scheduling message 202 are shown larger than the other signals to indicate that, in this case, the request message 201 and the scheduling message 202 are transmitted non-directionally and at a higher power level than the others, so as to improve reception while the entities are not yet able to use beamforming to enhance communication.

The beam scan 203 includes transmission of a plurality of beamformed signals, each at a different transmission angle, each beam scan signal indicated by a small box, which in this case represents one resource element per beam transmission. Further resource elements 207 represent a reply window 204 which is a region of time or frequency in which the user device can transmit a reply signal 208 to the base station, indicating which beam scan signal 203 provided the best reception. Also shown in the third line is the received signal at the user device during the beam scan 203, with height representing received amplitude. The amplitude is low at first, when the beam is not aimed toward the user device, and is highest when the beam is directed toward the user device, as indicated by a shaded resource element at best reception 205. The user device then waits a predetermined $\Delta T$ 206 after that peak amplitude is detected, and then transmits the reply signal 208. In this case, the predetermined delay $\Delta T$ 206 equals the duration of the beam scan 203. Hence, in this case, the reply window 204 begins immediately after the beam scan 203 finishes. The user device transmits a brief reply signal 208 after the delay time 206. The symbol-time of the reply signal 208 thereby indicates, to the base station, which beam provided the best reception. The base station receives the reply signal 208 during the reply window 204, determines the time of the reply signal 208, and thereby determines, from the specific time of the reply signal, which of the transmitted beams was selected by the user device. The base station then uses that selected beam direction for transmitting and receiving messages with the user device thereafter. The base station assumes, in this case, that the best reception beam is in the same direction as the best transmission beam, as is commonly the case in wireless messaging.

Figure 2B:
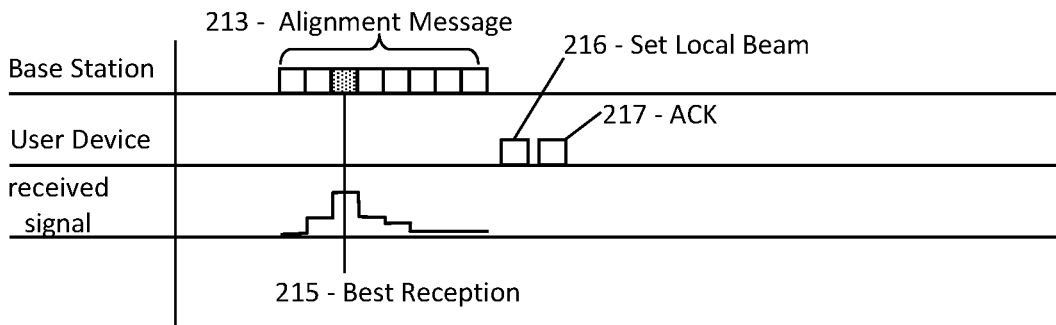
FIG. 2B is a sequence chart showing an exemplary embodiment of an efficient reception beam scan by a user device, according to some embodiments.

FIG. 2B is a sequence chart showing an exemplary embodiment of a resource-efficient reception beam scan by a user device, according to some embodiments. As depicted in this non-limiting example, the base station transmits an alignment message 213 consisting of a plurality of resource elements with all the same uniform signal therein and the same direction. During the alignment message 213, the user device receives the alignment message while varying its reception beam direction, thereby determining which of the user device's internal antenna settings results in the best reception. There is no need for the user device to inform the base station of that choice, because it is an internal setting of the user device; the base station simply provides the uniform signals 213 on which the base station can test its reception directions. If the alignment message 213 is intended for just one user device, the base station can transmit the alignment message 213 using the best beam 205 direction, as determined in the previous example. However, if multiple user devices at different locations are aligning their antenna directions at the same time, it may be necessary for the base station to transmit the alignment message 213 non-directionally so that all of the user devices can receive them.

On the third line is the received signal at the user device, as the user device varies its reception beam direction during the alignment message 213. As shown, the received amplitude is maximum at the best reception 215 direction, thereby enabling the user device to determine which beam direction is aimed toward the base station. Then, after selecting the optimal reception beam direction, and assuming that the optimal transmission beam is the same as the optimal reception beam, the user device sets its antenna to transmit and receive messages from the base station according to that selected beam at 216. (The user device beam adjustment 216 is an internal action of the user device, not a transmitted signal.) Then, the user device transmits an acknowledgement 217 to the base station, preferably using the recently selected transmission beam direction. Optionally (not shown), the user device can also transmit a channel-state information message indicating the signal quality received at the best reception beam setting 215.

Figure 2C:
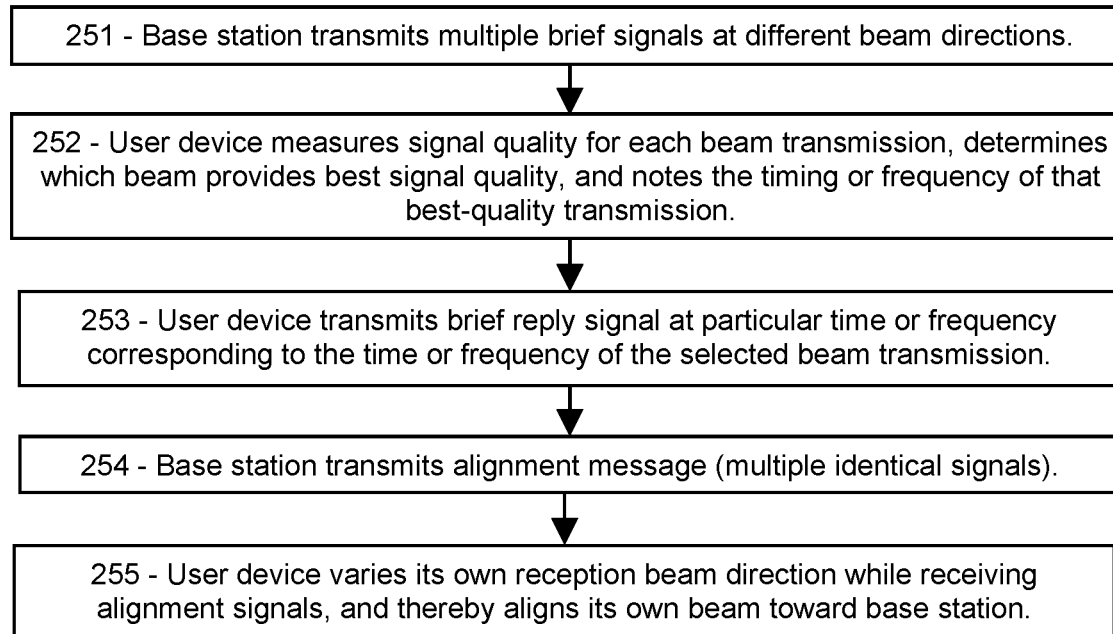
FIG. 2C is a flowchart showing an exemplary embodiment of a procedure for base stations and user devices to align their beams, according to some embodiments.

FIG. 2C is a flowchart showing an exemplary embodiment of a procedure for base stations and user devices to align their beams, according to some embodiments. As depicted in this non-limiting example, at 251 a base station transmits a plurality of brief beam scan signals in different directions, all with the same amplitude and phase. The beam directions may be around a plane, such as a horizontal plane, or they may be three-dimensional, as when the base station is on a tower or mountain and the user devices are arrayed at ground level below, for example.

At 252, the user device monitors the pre-scheduled channel frequency and detects the beam scan signals, determining which beam scan signal provides the best reception or signal quality at the user device. The user device notes the time or frequency, or both, of that best beam scan signal. Then, at 253, during a predetermined reply window, the user device transmits a brief reply signal at a time or frequency corresponding to the time or frequency of the favored beam scan signal. For example, if the beam scan signals occupy sequential symbol-times at the same subcarrier, then the reply signal may be transmitted at a predetermined time delay after the best-received beam scan signal; and if the beam scan signals are transmitted on sequential subcarriers, the reply signal may be at the subcarrier of the best-received beam scan signal, for example. In either case, the base station can determine, at 253, which beam direction is preferred according to the time or frequency of the reply signal. Extensive handshaking is neither desired nor required, saving considerable time and complexity.

Then, at 254, the base station may transmit an alignment message consisting of a plurality of resource elements all modulated the same way and transmitted the same way. At 255, the user device attempts to receive those signals by varying its (the user device's) reception beam direction. The user device thereby determines the optimum beam direction toward the base station.

In some embodiments, the beam scan signals are just one resource element in size. In other embodiments, the beam scan signals may be two resource elements, such as a short-form demodulation reference, or other number of resource elements per beam direction. When multiple resource elements are used in each beam scan signal, they may be configured as time-spanning or frequency-spanning. The parameters and configuration of the beam scan and alignment procedure may be specified in a system information message or another message from the base station to the user devices.

In some cases, the user device may be unable to do beamforming. Many low-cost special-purpose devices, such as sensors, transmit and receive non-directionally only. The user device may inform the base station of its limitations upon joining the network, or at another time, in which case the base station may terminate the procedure after 253, determination of the best beam from the base station for that user device, and may skip the alignment message 254 and so forth.

Following is a third example, showing how the various beam messages may be arranged time-spanning or frequency-spanning in a resource grid.

FIG. 3A is a schematic showing a resource grid with a resource-efficient time-spanning beam selection message, according to some embodiments. As depicted in this non-limiting example, a resource grid of three subframes 320 is demarked in subcarriers 322 and symbol-times 323, with a single resource element 321 indicated. A time-spanning beam scan 303 is shown, each resource element having transmission in a different direction. Each transmission occupies a single resource element (one symbol-time and one subcarrier) in this example. The beam scan signals 303 are all identical, other than direction, so the user device can compare them fairly.

The beam scan signals 303 are received by a user device, which determines that a particular beam scan signal 305 (stippled) provides the best reception. The user device waits a predetermined delay $\Delta T$ 306 after the best reception is detected, and then transmits a reply signal 308. In the meantime, the base station has completed the beam scan 303 and has started monitoring the channel during a predetermined reply window 304, and therefore detects the reply signal 308. In addition, the base station can determine, from the time of the reply signal 308, which beam was selected. In this example, the delay time 306 equals one subframe width, so the reply signal 308 occurs in the next subframe, but at the same symbol-time as the best reception 305. The base station can thereby determine which beam direction is preferred according to the symbol-time of the reply signal 308, and can use that preferred beam direction thereafter, for both transmission and reception of communications with the user device.

At a predetermined time later, such as in the next subframe, the base station transmits an alignment message 313 which is a series of resource elements with the same transmission in each resource element. The user device, if it is capable of beamforming, can then attempt to receive the alignment message signals while varying its (the user device's) reception beam, and can thereby determine which reception beam direction provides the best reception 315. The user device can then transmit and receive messages with the base station using that best-reception beam 315 thereafter.

After determining the best beam for the base station and the best beam for the user device, the user device transmits an acknowledgement 317. The acknowledgement 317 is transmitted using the user device's best transmission beam 315 for communications with the base station, and it is received by the base station using the base station's best reception beam 305 for communications with that user device. Thus the base station and user device have both optimized their beam directions for communication with each other, while occupying a single subcarrier in three subframes, in this example.

FIG. 3B is a schematic showing a resource grid with time-spanning beam alignment messages for multiple users, according to some embodiments. As depicted in this non-limiting example, a base station assists three user devices in aligning both the base station beams and the user device beams. As before, the base station transmits a series of beam scan signals 333 in a sequence of symbol-times, however in this case each beam scan signal 333 has two resource elements in two subcarriers 335. For example, the beam scan signals 333 may be short-form two-point references that exhibit the maximum and minimum values (such as amplitudes and/or phases) of a modulation scheme, or other information that can be packed into two resource elements 335.

The three user devices transmit their reply messages in a reply window 334 in the next subframe, with each user device assigned a different subcarrier of the reply window 334. Thus the first user device transmits a reply signal 338 indicating which beam direction is most strongly received at that user device, and the third user device transmits a different reply message 339 at a different time of the reply window, indicating a different beam direction preference. The second user device transmits two reply messages 336 and 337, thereby indicating that both of the corresponding beam scan signals provided similar high signal quality. The base station, upon detecting the two reply signals 336, 337 can then use a beam direction between those two beams, such as half-way between them.

The three user devices then align their own beams toward the base station using the alignment message 343. In this case, the base station transmits three alignment messages in three directions to the three user devices, using the base station beam directions that were selected in the reply windows 334. During the alignment messages 343, the user devices can vary their own reception beam directions to optimize the amplitude or signal quality of the received signals.

Finally the three user devices transmit acknowledgement messages 347, 348, 349 using their aligned beams toward the base station.

FIG. 3C is a flowchart showing an exemplary embodiment of a time-spanning procedure for base stations and multiple user devices to align their beams, according to some embodiments. As depicted in this non-limiting example, at 351 a base station transmits a series of brief beam scan signals at different directions in successive symbol-times, while one or more user devices attempt to receive those signals and determine which beam provides the best signal quality. Then at 352, the user devices transmit reply messages at a time corresponding to their favored beam scan signal, but on the subcarrier assigned to each of the user devices, so as to avoid contention and interference. At 353, the base station transmits alignment messages, one for each of the user devices, on separate subcarriers (which may be the same subcarriers assigned for the reply messages), and directed according to the previously selected beam directions from the base station. The user devices vary their reception beam directions while attempting to receive the alignment message, and thereby determine which local beam direction best communicates with the base station.

FIG. 4A is a schematic showing an exemplary embodiment of an efficient frequency-spanning beam selection, according to some embodiments. As depicted in this non-limiting example, a resource grid 420 includes frequency-spanning messages similar to the time-spanning messages of the previous examples. Frequency-spanning beam alignment messages provide lower latency than time-spanning. Frequency-spanning and time-spanning messages both occupy the same number of resource elements. As mentioned, frequency-spanning alignment messages generally place greater demands on the user device's signal processing electronics than time-spanning. A frequency-spanning beam scan, on the other hand, places demands on the base station including digital beamforming, but should be relatively simple for the user device to detect and analyze.

For user devices that can handle frequency-spanning alignment messages, the example provides specifics. First, the figure shows a frequency-spanning beam scan 403. The beam scan 403 is demarked by a non-directional scan-start signal 402. The beam scan 403 appears the same as an ordinary 5G/6G frequency-spanning message, and therefore user device receiver can receive and interpret the beam scan 403 in the usual way. The user device can thereby determine which subcarrier has the best signal reception 405. The user device can then inform the base station of the favored beam, by transmitting a brief (one resource element in this case) reply signal 408 during a predetermined reply window 404. The user device transmits the reply signal 408 on the same subcarrier 406 as the best reception of the beam scan 403, thereby indicating which beam the user device favors. The base station can determine, according to the subcarrier of the reply message 408, which transmission beam to use for further communication with the user device.

At a predetermined time later, the base station transmits an alignment message 413 toward the user device, using a transmission beam in the direction determined according to the reply signal 408. No start pulse is transmitted before the alignment message 413 in this case, since the user device is expected to know the position of the alignment message relative to the reply window 404, or relative to the beam scan 403. The alignment message 413 is a number of resource elements, arranged frequency-spanning, transmitted by the base station with all the same signal in each resource element of the alignment message 413. The signal may be unmodulated carrier at each subcarrier frequency, or a modulated signal, for example. The user device can then vary its reception beam direction, different for each resource element of the alignment message 413, and can thereby determine which direction, relative to the user device, provides the best reception 415. The user can then use a transmission beam in the same direction to communicate with the base station.

At another predetermined time later, the user device transmits, to the base station, using the user device's best reception beam for transmission, an acknowledgement 416 and, in this case, a channel state information message 417 based on the signal quality observed by the user device during the alignment message 413 at the best reception direction 415. The base station, detecting the CSI 417, can then adjust its (the base station's) power level when transmitting to the user device, thereby providing sufficient reliability without excess transmission power. In addition, the base station can advise the user device as to its (the user device's) power level, based on the amplitude received by the base station for the acknowledgement 416 and/or the CSI 417.

FIG. 4B is a schematic showing an exemplary embodiment of an efficient frequency-spanning beam selection for multiple users, according to some embodiments. As depicted in this non-limiting example, at a scheduled time, a base station transmits a plurality of beam scan signals 433 at different directions on successive subcarriers, while a plurality of user devices (three, in this case) receive the beam scan signals 433, separate them using signal processing, and determine which of the beams provides the best reception. Then, at pre-assigned reply window 434 symbol-times, the three user devices transmit their reply signals 438, on the same subcarriers as the favored beam scan signals for each user device. The base station, receiving the three reply signals 438 and determining which of the beams are associated with which reply signals 438, can use those beams thereafter for communicating with the user devices specifically, that is, unicast and beamformed.

The base station then assists the user devices in aligning their own beams toward the base station by broadcasting an alignment message 443 including a plurality of resource elements arranged frequency-spanning. However, in this case the alignment message is not transmitted using the favored beam directions of each user device, but instead is broadcast non-directionally so all can receive it. In another embodiment, if the base station has sufficient beamforming flexibility, the base station may configure the alignment message to have multiple peak directions with one peak power direction toward each of the three user devices. For example, the base station can digitally add the antenna configurations for each of three separate beams toward the user devices, and thereby generate a three-peaked emission pattern. The user devices then receive the alignment message 443 by applying a different antenna reception beam for each subcarrier of the alignment message 443, and thereby determine their own best beam directions toward the base station. Finally, the user devices, using their transmission beams aimed at the base station, transmit three acknowledgement messages 446 and three channel-state information messages 447, on three pre-assigned symbol-times.

FIG. 4C is a flowchart showing an exemplary embodiment of a frequency-spanning procedure for base stations and multiple user devices to align their beams, according to some embodiments. As depicted in this non-limiting example, at 451 a base station transmits multiple brief signals on successive subcarriers, each signal in a different direction, while user devices receive and measure the signals to determine which direction is best received. At 452, user devices transmit, in a pre-assigned reply window, a brief reply message indicating, by the subcarrier of the reply message, which subcarrier of the beam scan was best received, and thereby inform the base station which beam to use in communicating with each of the user devices. At 453, the base station transmits a plurality of uniform signals on success subcarriers. The alignment signals may be transmitted non-directionally, or they may be tailored to have transmission maxima aimed at the various user devices, depending on the implementation. During the alignment message, the user devices vary their reception beam directions, aiming differently during each subcarrier of the alignment message, and thereby determine the correct beam direction for communicating with the base station.

It may be noted that transmitting the beam scan signals 433 in multiple directions on successive subcarriers, all simultaneously, puts great demands on the base station electronics. Also stressful is configuring the transmission of the alignment message elements to be directed toward multiple different directions at the same time, that is, a multi-peaked angular distribution of transmitted power. However, some base stations in the coming 5G rollout are expected to have digital antenna controls, and may be able to do exactly that. In addition, the frequency-spanning alignment message 443 puts great demands on the user devices, since they must vary their reception beams on successive subcarriers all at the same time. Some sophisticated user devices may be able to handle it, but most user devices probably will not, at least for the foreseeable future. Therefore, the example is for the most capable wireless systems. The following figures are for less capable user devices.

FIG. 5A is a schematic showing an exemplary embodiment of a resource-efficient frequency-spanning and time-spanning beam selection, according to some embodiments. As depicted in this non-limiting example, a resource grid 520 includes both frequency-spanning and time-spanning messages, to accommodate a user device that cannot vary its reception beam in multiple directions at sequential subcarriers at a single symbol-time. As in the previous example, the base station transmits a beam scan 503 frequency-spanning, and the user device can determine that a particular subcarrier 505 provides the best reception. Then, during a frequency-spanning reply window 504, the user device transmits a reply signal 508 at the same subcarrier 506 as the best reception beam 505.

In this case, the user device cannot receive multiple beam directions simultaneously. Therefore, the base station provides an alignment message 513 time-spanning as shown, instead of frequency-spanning. The user device can vary its reception beam successively, during each symbol-time of the alignment message 513, and can thereby determine that a particular beam direction 515 provides the best reception. Then, using that best quality beam direction, the user device can transmit an acknowledgement 516 and a CSI 517 to the base station. Thus the base station and the user device have aligned their beams toward each other, while allowing the user device to avoid the difficult task of arranging multiple reception beam directions in separate subcarriers at a single time.

FIG. 5B is a schematic showing another exemplary embodiment of an efficient frequency-spanning beam selection for multiple users, according to some embodiments. As depicted in this non-limiting example, a base station transmits a beam scan 533 frequency-spanning, and three user devices determine thereby which beam provides the best reception. Then during an assigned reply window 534, each user device transmits a reply signal 538 at the subcarrier of the favored beam scan signal, thereby informing the base station which beams to use when communicating with those user devices. Then the base station transmits an alignment message 543, but his time the alignment message 543 is time-spanning in successive symbol-times, so that the user devices can test their reception beams successively in time on the alignment message elements. This is very much easier for a user device to do, than varying the direction of reception in different subcarriers simultaneously as described above. The user devices can thereby determine their own optimal direction toward the base station.

FIG. 5C is a flowchart showing an exemplary embodiment of a simpler procedure for base stations and multiple user devices to align their beams, according to some embodiments. As depicted in this non-limiting example, at 551 a base station transmits multiple brief beam scan signals frequency-spanning, on successive subcarriers, and the user devices determine which beam signal is best received. At 552, the user devices transmit brief reply signals at a pre-assigned symbol time and on whichever subcarrier held the best-received beam scan signal, thereby informing the base station which beam direction each user device prefers. At 553, the base station transmits an alignment message non-directionally and time-spanning, which the user devices detect using a variety of reception beams, and thereby determine their own proper direction toward the base station. No acknowledgement is needed because the reply messages served that purpose, and no channel-state information messages are needed because the alignment message was transmitted non-directionally, and therefore is not a realistic measure of the base station link to the user devices. At some later time, the user devices can provide channel state information separately.

Following is a fourth example showing steps in a procedure to align network beam directions.

FIG. 6 is a flowchart showing an exemplary embodiment of a procedure for aligning beam directions, according to some embodiments. As depicted in this non-limiting example, a user device of a network that includes a base station can transmit, at 601, a beam-selection request message requesting beam alignment service. The user device and the base station do not know each other's locations at that time, so the user device transmits the request message non-directionally and at a high power level, while the base station receives the request message using a non-directional antenna setting.

Alternatively, at 602, the base station can initiate the process by transmitting a beam-selection scheduling message to the user device, thereby scheduling the alignment service. The base station may transmit the scheduling message non-directionally and at high power, while the user device can receive the scheduling message using a non-directional antenna setting.

In either case, at 603, the base station transmits a series of brief signals sequentially, on multiple beam directions. In one version, the base station can transmit the brief beam scan signals sequentially in time at a single subcarrier frequency (time-spanning). In the other version, the base station can transmit the beam scan signals sequentially on multiple subcarriers at a single symbol-time (frequency-spanning). In either version, the user device, at 604, measures the signal quality for each of the resource elements of the beam scan signals, and determines which of the received beam signals provides the best amplitude (or SNR or other measure of signal quality). The user device may note the symbol-time of the best-quality beam signal (if time-spanning), or the best-reception subcarrier (if frequency-spanning).

The user device then informs the base station of which beam provides the best signal. The user device does so by transmitting a brief (such as a single resource element) signal within a reply window that is previously defined by the base station. The manner of transmitting the reply signal depends on whether the beam scan signals were transmitted time-spanning or frequency-spanning. At 605, the beam scan signals were ordered or sequenced in time, so the user device indicates the favored beam by transmitting a brief reply signal 606 at a particular time corresponding to the time of the best-quality beam signal. The base station detects the reply signal at that particular time and at 608 determines which beam direction was selected by the user device. The base station may monitor a previously-reserved reply window of sequential symbol-times, each resource element of the reply window having a one-to-one correspondence with the symbol-times of the beam scan signals, and thereby determines which beam direction to use in communicating with the user device.

Alternatively, if the beam scan signals are sequential in frequency at 605, the reply window is a set of subcarriers at a single symbol-time, each subcarrier of the reply window matching the corresponding subcarrier of the beam scan signal, in this embodiment. The user device then informs the base station of the preferred beam by transmitting a brief reply signal 607 to the base station at the particular frequency (subcarrier) which corresponds to the frequency of the best-quality beam signal. The base station determines 609 which beam direction was selected by the user device, according to the frequency of the reply signal. More specifically, the base station monitors a previously-reserved reply window, the reply window having sequential subcarriers at a particular symbol-time. Thus there is a one-to-one correspondence between the subcarriers of the beam scan signals and the subcarriers of the reply window. The base station can thereby determine which beam direction is preferred by the user device.

The example also includes procedures for the user device to align its transmission and reception beams toward the base station, if the user device is capable of beamforming. At 610, the base station determines (or already knows) whether the user device is capable of beamforming. If so, at 611 the base station transmits an alignment message consisting of multiple resource elements, all transmitted identically with the same signal and same direction toward the user device. The alignment message may be time-spanning or frequency-spanning, depending on the capabilities of the user device. Frequency-spanning alignment is difficult because the user device would need to detect multiple beam directions in sequential subcarriers at the same time, a challenge for most user devices. In this example the alignment message is assumed to be time-spanning.

At 612, the user device receives the alignment message while varying its reception beam to multiple directions, and thereby determines which reception direction provides the best signal quality. At 613, the user device transmits an acknowledgement to the base station using a transmission beam direction equal to the optimal reception beam direction determined at 612. Also, the base station receives the acknowledgement using a reception beam, at the base station, equal to the selected optimal transmission beam determined at 608 or 609. At that point, both entities are aligned with each other.

Optionally (in dash), at 614, the user device can transmit a channel-state information message indicating the signal quality received by the user device. For example, the user device can evaluate the final signal quality based on the signal received from the beam selection signal (at 604) if the user device does not use beamforming, or from the alignment signal (at 612) if it does use beamforming. The base station can then instruct the user device to adjust its transmission power according to the observed signal quality, to avoid wasting energy and generating unnecessary background. In addition, the base station can adjust its own transmission power, for future communication with the user device, based on the signal quality received by the base station on the reply message (at 608 or 609) or the acknowledgement message (at 613). After aligning their transmission and reception beams, the base station and the user device may be able to use less transmission power without loss of reliability, thereby saving energy and reducing backgrounds.

The foregoing example provided separate messaging for the base station and user device to align their respective beams. In the following examples, the alignment step is avoided. After the user device selects the best beam scan signal direction, the base station then transmits a message to the user device indicating the compass direction of the optimal beam toward the user device, as selected by the user device's reply message. With that geographical direction information, the user device can set its own beam toward the base station by adding or subtracting 180 degrees to the base station's compass measurement. Setting the user device's beam opposite to the base station's beam may be simpler than using the alignment message procedure, but it requires the user device to have a compass or otherwise determine geographical directions. In addition, the beam between the base station and the user device is assumed to be nearly line-of-sight with no large-angle reflections.

Figure 7:
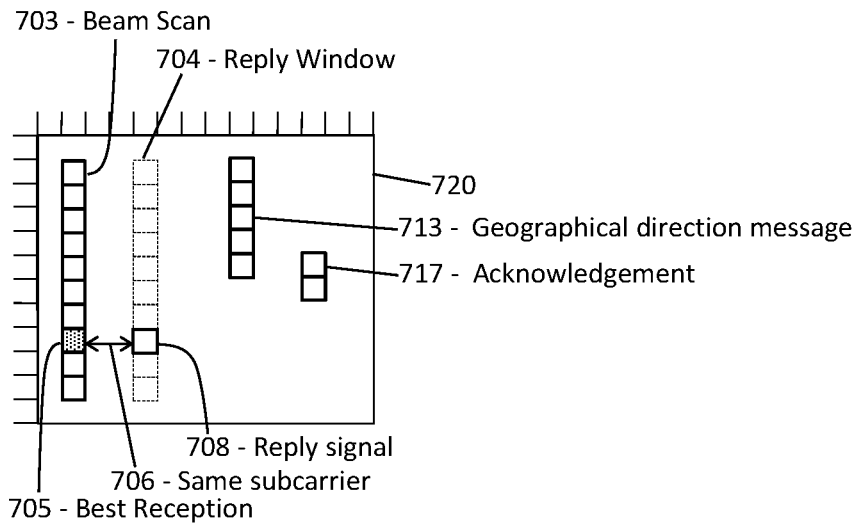
FIG. 7 is a schematic showing a resource grid with an efficient beam selection and direction information, according to some embodiments.

FIG. 7 is a schematic showing a resource grid with resource-efficient beam selection and direction messages, according to some embodiments. As depicted in this non-limiting example, a resource grid 720 includes a frequency-spanning beam scan 703 including multiple frequency-spanning resource elements, each beam scan resource element containing a signal transmitted in a different directions. The user device can receive the beam scan 703, determine which subcarrier provides the best signal 705 (stippled) and then reply 708 in a predetermined reply window 704 (ghosted) using the same subcarrier 706 as the best reception 705 signal.

To assist the user device in directing a beam back toward the base station, the base station transmits a geographical direction message 713. This is instead of an alignment message. In the geographical direction message 713, the base station indicates the geographical direction of the base station's beam 705 selected by the user device. The user device can then adjust its own beam toward the base station by adding or subtracting 180 degrees to the angle indicated in the geographical direction message 713. The user device can thereby align its beam toward the base station without an alignment message (assuming the user device has a compass or other means for determining geographical directions). The user device then sends an acknowledgement 717 to the base station, using that calculated beam direction. If the user device is not equipped with an electronic compass or equivalent, then the user device can decline to transmit the acknowledgement 717. Alternatively, if the user device has a compass and transmits the acknowledgement message 717, but in fact the beam path is bent due to a reflection, then the base station is unlikely to receive the acknowledgement 717 since it will be aimed in the wrong direction, due to the reflection. In either case, the base station would fail to receive an acknowledgement, and therefore may transmit an alignment message as discussed previously, so that the user device can align its beam toward the base station despite the reflection or the lack of compass.

Figure 8:
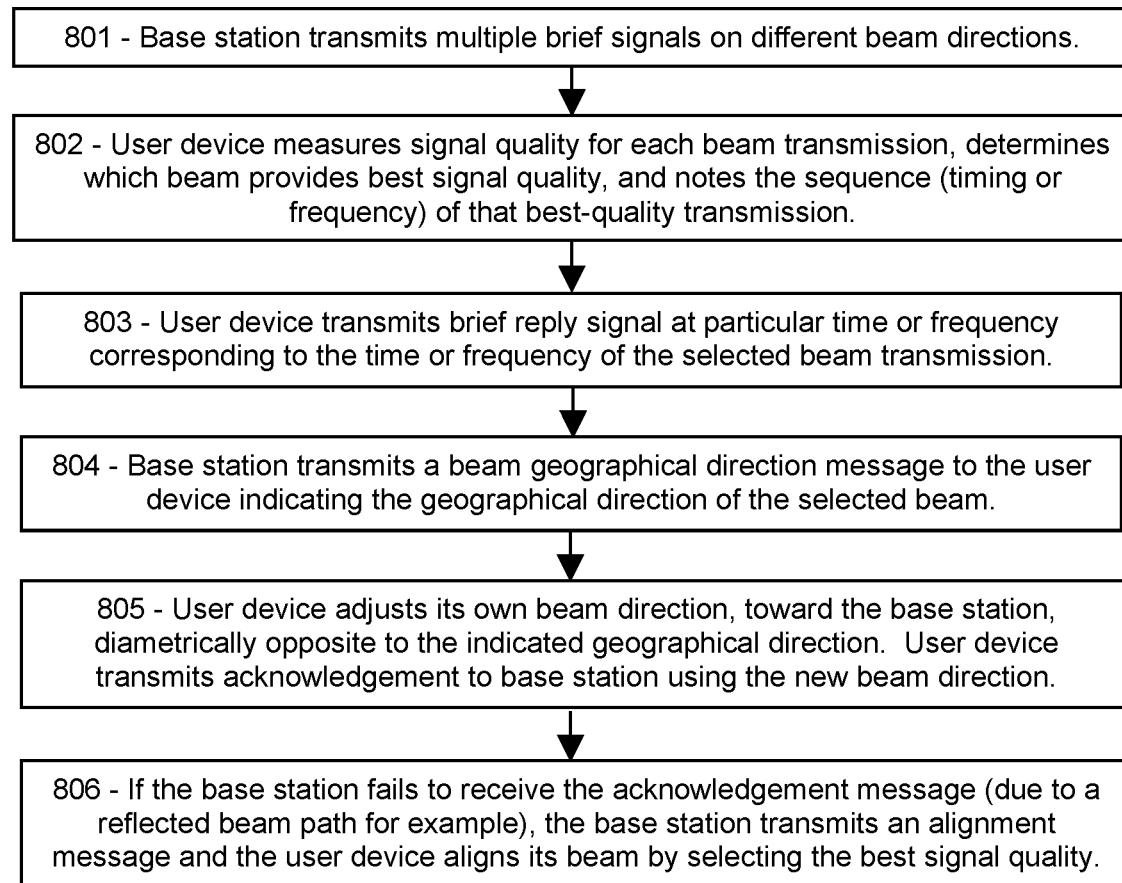
FIG. 8 is a flowchart showing another exemplary embodiment of a procedure for aligning beam directions, according to some embodiments.

FIG. 8 is a flowchart showing an exemplary embodiment of a procedure for aligning beam directions based on geographical directions, according to some embodiments. As depicted in this non-limiting example, the alignment message is replaced by a geographical direction message, enabling the user device to align its beam toward the base station. At 801, the base station transmits a series of beam scan signals on successive symbol-times or subcarriers, each with a different beam direction. At 802, the user device measures the received signal quality for each of the beam scan signals and determines which one provides the best signal quality. At 803, the user device transmits a brief reply signal at a time and frequency corresponding to the selected beam scan signal. At 804, the base station determines, from the timing or frequency of the reply signal, which beam provides the best reception with the user device, and notes the geographical direction (such as a compass direction in degrees, for example) of the favored beam. The base station then transmits a "geographical direction" message to the user device, on the selected beam direction, indicating the geographical direction of the selected beam toward the user device. At 805, the user device receives the geographical direction message, adds or subtracts 180 degrees, determines (based on an internal compass, for example) geographical north, and sets its own beam toward the base station in the calculated direction. Then, using that beam setting, the user device transmits an acknowledgement to the base station. At 806, if the base station fails to receive the acknowledgement message (due to lack of compass, reflected beam path, or other mishap), the base station transmits an alignment message as discussed previously, and the user device can vary its reception beam direction to determine which direction provides the best reception of the alignment message, thereby completing the mutual beam alignment.

Optionally (not shown), the base station can use the selected base station beam to receive the acknowledgement message, and can measure the signal strength received thereby, and determine whether the user device can safely reduce the transmission power without loss of reliability. The base station can then transmit a power-adjustment message to the user device. Optionally (not shown), the user device can measure the signal quality received in the power-adjustment message and transmit a CSI back to the base station, so that the base station can adjust its own transmission power accordingly.

The following examples show procedures for a reduced-capability user device, which lacks beamforming capability, to assist the base station in aligning the base station's beam.

Figure 9:
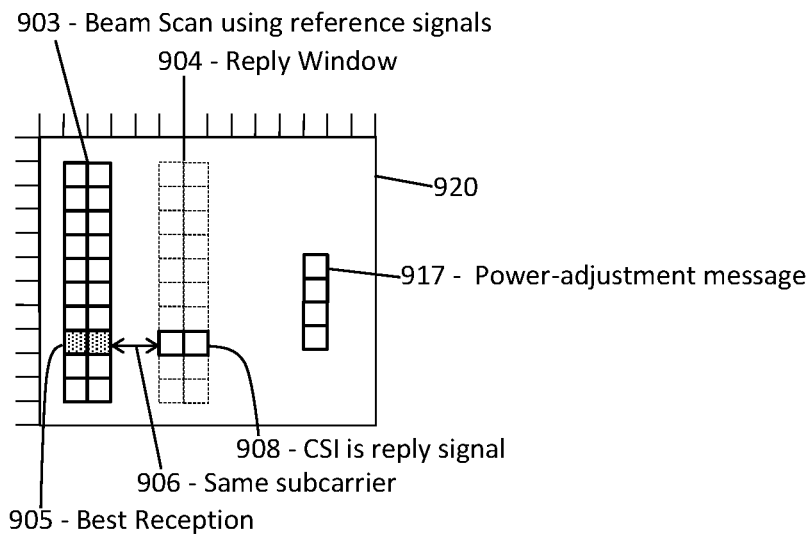
FIG. 9 is a schematic showing a resource grid with an efficient beam selection for user devices that lack beamforming, according to some embodiments.

FIG. 9 is a schematic showing a resource grid with a resource-efficient beam selection for user devices that lack beamforming, according to some embodiments. As depicted in this non-limiting example, a base station aligns its beam toward a user device, but the user device has no beamforming capability itself, and therefore the alignment message step is skipped. A resource grid 920 includes a frequency-spanning beam scan 903 including multiple resource elements with the base station transmitting signals in different directions for different subcarriers. The user device can receive the beam scan 903, determine which subcarrier provides the best signal 905, stippled, and then reply in a predetermined reply window 904 (ghosted) using the same subcarrier 906 as the best reception 905 signal. However, in this case the reply signal 908 is configured as a CSI message indicating the signal quality received by the user device in that best-quality beam scan signal 905. To accommodate the size of the CSI message, the reply window 904 is made longer in time, including a sufficient number of symbol-times corresponding to the number of bits in the CSI 908. The figure shows two resource elements in the CSI, but a different number of resource elements may be needed, depending on the modulation. If so, the reply window 904 may be made wide enough to accommodate by adding more symbol-times to the reply window. The base station, receiving the CSI 908, can do two things. First, the base station can adjust its own power level according to the signal quality reported in the CSI 908. There is no reason to waste energy and generate backgrounds by transmitting higher power levels than needed for reliable reception. Secondly, the base station can determine, from the signal quality of the as-received CSI message 908, what power level the user device should be using, and may transmit a power-adjustment message 917 to the user device for that purpose. Preferably, the base station transmits the power-adjustment message 917 using the selected beam 905. Thus the base station has aligned its beam toward the user device, and the user device has adjusted its power levels accordingly. There is no alignment message or the like, because in this case the user device has no beamforming capability.

In another embodiment, the base station may not be prepared to transmit multiple beam directions on successive subcarriers at a single time, that is, the frequency-spanning beam scan 903. In that case, the base station can transmit the beam scan 903 as time-spanning, and can reserve the reply window 904 as time-spanning but with two subcarriers, to still provide two resource elements for the CSI (or whatever number of resource elements it requires in a particular embodiment).

Figure 10:
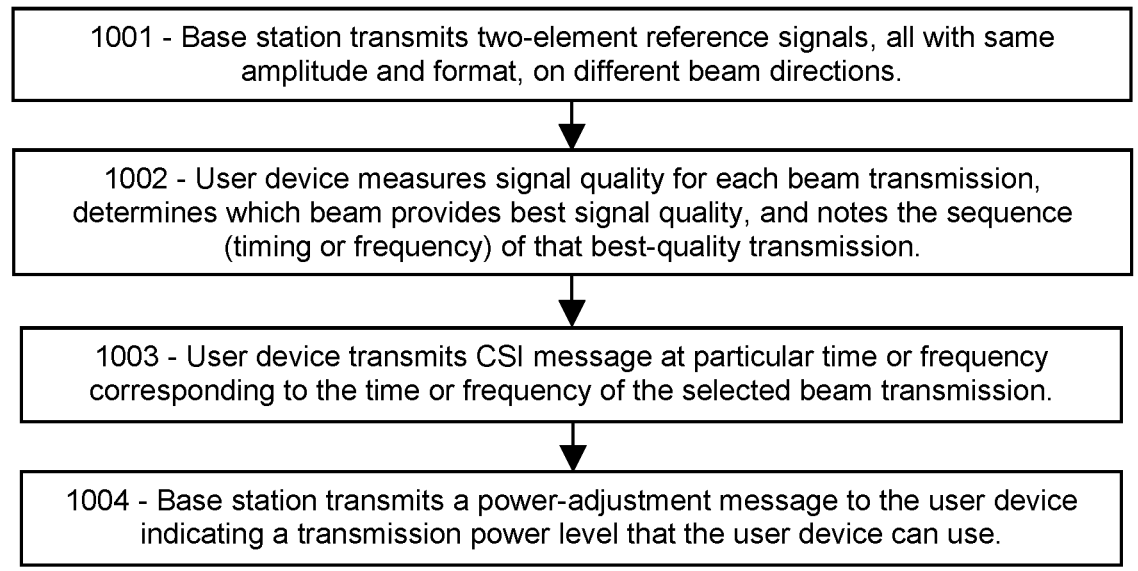
FIG. 10 is a flowchart showing another exemplary embodiment of a procedure for user devices that lack beamforming, according to some embodiments.

FIG. 10 is a flowchart showing an exemplary embodiment of a procedure for user devices that lack beamforming, according to some embodiments. As depicted in this non-limiting example, the alignment message is skipped because the user device has no beamforming capability. At 1001, the base station transmits a series of beam scan signals on successive symbol-times or subcarriers, each with a different beam direction. At 1002, the user device measures the received signal quality for each of the beam scan signals and determines which one provides the best signal quality. At 1003, the user device transmits a CSI message at a time and frequency corresponding to the selected beam scan signal. At 1004, the base station determines, from the timing or frequency of the CSI reply signal, which beam provides the best reception with the user device. The base station adjusts its own power level, for future transmission to the user device, based on the values provided in the CSI message, to avoid using excessive power when it is not needed. The base station also measures the as-received beam quality of the CSI message itself, and at 1004 transmits a power-adjustment message to the user device instructing the user device what power level to use in future communications with the base station.

The systems and methods disclosed herein may enable base stations and wireless devices to align their transmission and reception beams toward each other in a managed network. In a non-managed network such as an ad hoc network among mobile user devices, the communicating entities can align their beams in the same way, with one of the mobile user devices temporarily assuming the role of the base station, for example.

The systems and methods may enable wireless devices to align their reception and transmission beam directions quickly and efficiently, with little consumption of resource elements. The systems and methods may thereby provide improved communication reliability with less energy consumption and less background generation, thereby enhancing network function and user satisfaction overall.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a base station of a wireless network to align a beam from the base station to a user device of the network, the method comprising:
   a. transmitting a plurality of beam scan signals, each beam scan signal comprising a wireless transmission focused in a different direction, the beam scan signals spaced apart in time or in frequency;
   b. receiving, from the user device, a reply signal indicating a particular beam scan signal, the reply message comprising a wireless transmission at a time corresponding to a time of the particular beam scan signal or at a frequency corresponding to a frequency of the particular beam scan signal; and
   c. transmitting, to the user device, a subsequent message directed according to the particular beam scan signal;
   d. wherein the subsequent message comprises an alignment message comprising a plurality of alignment message elements, wherein all of the alignment message elements are transmitted with the same amplitude, phase, and spatial distribution.

2. The method of claim 1, wherein the beam scan signals are transmitted according to at least 5G technology.

3. The method of claim 1, wherein the particular beam scan signal provides higher signal quality than any other beam scan signal, wherein signal quality comprises a received amplitude or a received power level or a received signal-to-noise ratio at the user device.

4. The method of claim 1, wherein each beam scan signal comprises exactly one resource element, and the reply signal comprises exactly one resource element.

5. The method of claim 1, wherein each beam scan signal comprises two resource elements configured as a demodulation reference, and the reply signal comprises a channel-state information message.

6. The method of claim 1, wherein the beam scan signals are spaced apart in time, and the reply signal is received at a predetermined delay time after the particular beam scan signal.

7. The method of claim 1, wherein the beam scan signals are spaced apart in frequency, and the reply signal is received at the same frequency as the particular beam scan signal.

8. The method of claim 1, further comprising indicating, to the user device, a reply window comprising a plurality of resource elements, and receiving the reply signal within the reply window.

9. The method of claim 1, wherein the beam scan signals are spaced apart in frequency and the alignment message elements are spaced apart in time.

\* \* \* \* \*